(12) United States Patent
Sayers

(10) Patent No.: US 10,697,611 B2
(45) Date of Patent: Jun. 30, 2020

(54) NON-CIRCULAR OPTIC FOR DISTRIBUTING LIGHT

(71) Applicant: Eaton Intelligent Power Limited, Dublin (IE)

(72) Inventor: Wilston Nigel Christopher Sayers, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/921,161

(22) Filed: Mar. 14, 2018

(65) Prior Publication Data

US 2018/0266654 A1    Sep. 20, 2018

Related U.S. Application Data

(60) Provisional application No. 62/470,993, filed on Mar. 14, 2017.

(51) Int. Cl.
  *F21V 5/04* (2006.01)
  *F21V 7/00* (2006.01)
  *G02B 19/00* (2006.01)
  *F21Y 115/10* (2016.01)
  *G02B 27/09* (2006.01)

(52) U.S. Cl.
  CPC .............. *F21V 5/04* (2013.01); *F21V 5/045* (2013.01); *F21V 7/0091* (2013.01); *G02B 19/0028* (2013.01); *G02B 19/0061* (2013.01); *F21Y 2115/10* (2016.08); *G02B 27/0916* (2013.01)

(58) Field of Classification Search
  CPC .......... F21V 5/04; F21V 5/045; F21V 7/0091; G02B 19/0028; G02B 19/0061
  See application file for complete search history.

(56) References Cited

U.S. PATENT DOCUMENTS

| | | | | |
|---|---|---|---|---|
| 9,528,681 | B2* | 12/2016 | Saito | F21V 5/008 |
| 10,190,736 | B1* | 1/2019 | Pyshos | F21S 8/026 |
| 2009/0180286 | A1* | 7/2009 | Bamba | F21V 5/045 |
| | | | | 362/297 |
| 2011/0096553 | A1* | 4/2011 | Shimokawa | F21V 5/04 |
| | | | | 362/311.02 |
| 2014/0168972 | A1* | 6/2014 | Ebner | F21V 5/007 |
| | | | | 362/235 |
| 2014/0204591 | A1* | 7/2014 | Kim | G02B 19/0061 |
| | | | | 362/311.02 |
| 2016/0223157 | A1* | 8/2016 | Saito | G02B 19/0028 |
| 2016/0258594 | A1* | 9/2016 | Van Kaathoven | |
| | | | | G02B 19/0066 |

* cited by examiner

*Primary Examiner* — Andrew J Coughlin
*Assistant Examiner* — Michael Chiang
(74) *Attorney, Agent, or Firm* — King & Spalding LLP

(57) ABSTRACT

A non-circular optic is described that includes a base region, the base region including a rim and an exit surface. The non-circular optic further includes a projection that projects from the base region, the projection including a cavity. The cavity includes an open end, a bottom surface, and first, second, third, and fourth sidewalls that extend from the open end to the bottom surface. A first, second, third, and fourth total internally reflective surfaces each extend from the open end of the cavity to the rim of the base region.

17 Claims, 7 Drawing Sheets

SIMULATED RENDERINGS
OF A SQUARE TIR

SIMULATED RENDERINGS
OF A ROUND TIR

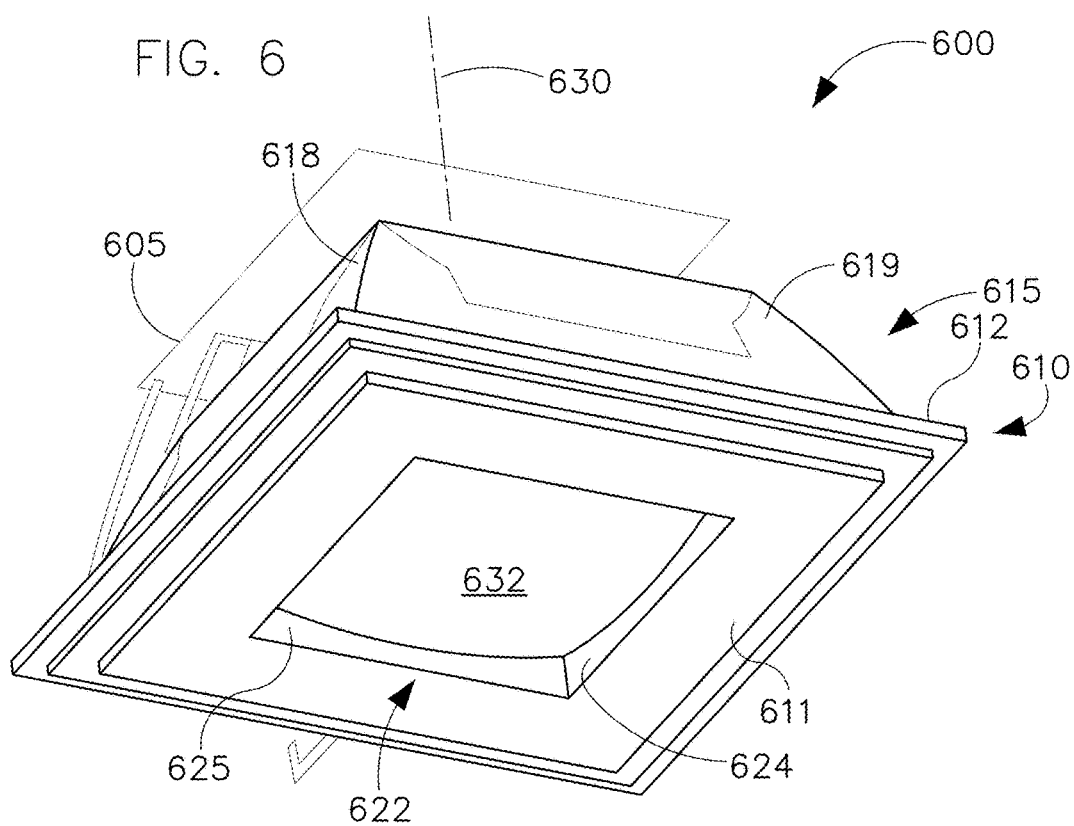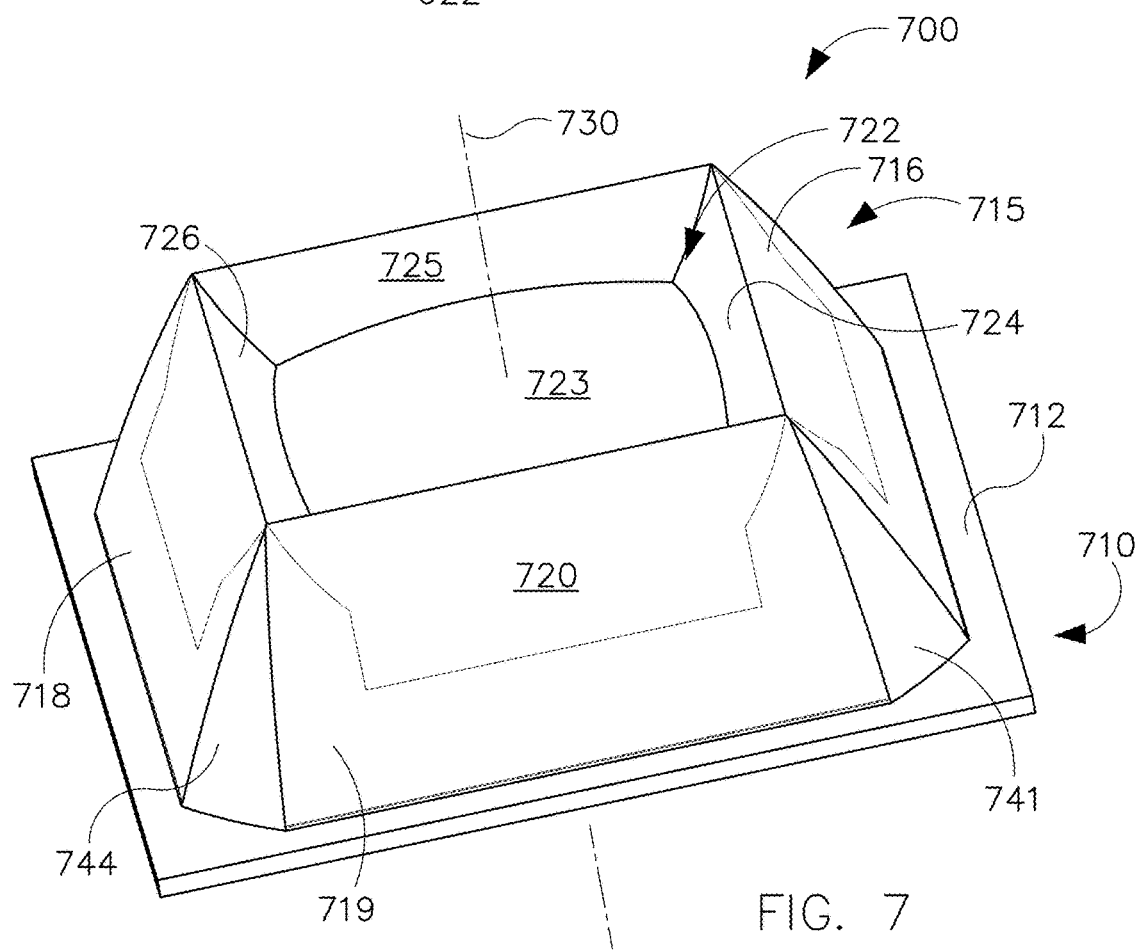

FIG. 8  SIMULATED RAY TRACES OF A SQUARE TIR AT 90° PLANE
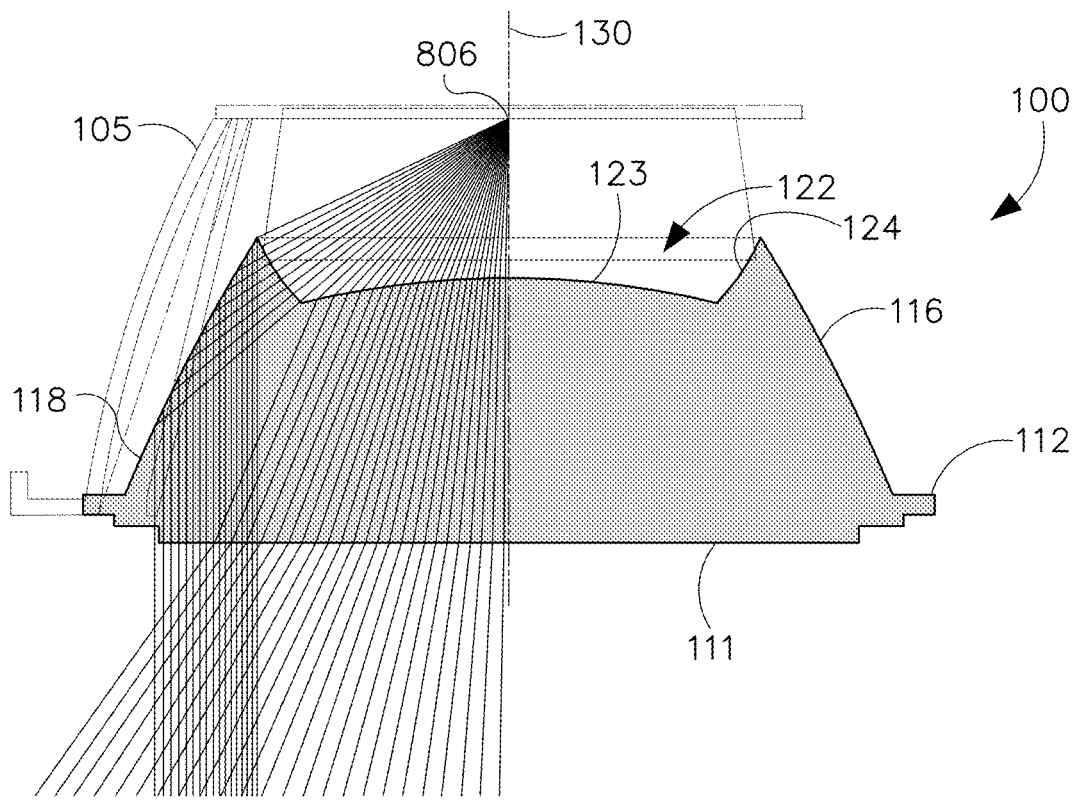
SIMULATED RAY TRACES OF A SQUARE TIR AT 45° PLANE
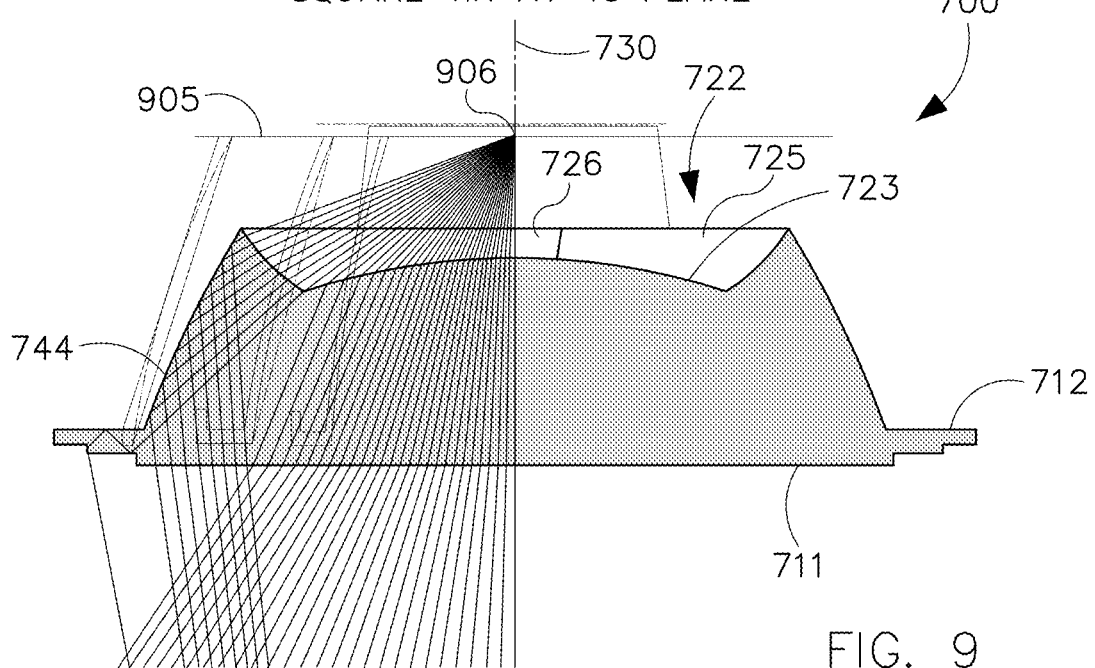
FIG. 9

NON-CIRCULAR OPTIC FOR DISTRIBUTING LIGHT

RELATED APPLICATIONS

The present application claims priority under 35 U.S.C. § 119(e) to U.S. Provisional Patent Application No. 62/470,993, filed Mar. 14, 2017, and titled "A Non-Circular Optic For Distributing Light," the entire contents of which is incorporated herein by reference.

TECHNICAL FIELD

Embodiments of the technology relate generally to illumination systems and more particularly to a non-circular optic that receives light from a light emitting diode and distributes the received light.

BACKGROUND

As compared to incandescent and fluorescent light sources, light emitting diodes (LEDs) offer substantial potential benefit associated with their energy efficiency, light quality, and compact size. However, to realize the full potential benefits offered by light emitting diodes, new technologies are needed.

For instance, there are needs in the art for technology to utilize light emitting diodes for illumination. A further need exists for optics and light-emitting-diode-based systems that can distribute light. Yet a further need exists for an optic or an optical system that can receive light from a light source and distribute the light for a luminaire with a non-circular aperture. For example, FIG. 1 illustrates a simulation of a luminaire with a substantially square aperture and a circular optic. However, such an arrangement produces an irregular or non-uniformly lit appearance. As shown in the simulation of FIG. 1, when looking into the substantially square aperture of the luminaire with a circular optic, there is a bright region in the center of the substantially square aperture and undesirable darker regions in the corners of the square aperture. Accordingly, a capability addressing one or more such needs, or some other related deficiency in the art, would support improved illumination and more widespread utilization of light emitting diodes in lighting applications.

SUMMARY

The present application is directed to a non-circular optic. In one example embodiment, the optic comprises a base region with a rim and an exit surface. The optic further comprises a projection that projects from the base region, the projection comprising a cavity that extends into the projection towards the base region. The cavity comprises an open end, a convex cavity bottom surface, and a first, a second, a third, and a fourth sidewall that each extends from the open end to the convex cavity bottom surface. The convex cavity bottom surface receives light from a light emitting diode and condenses the light. The optic further comprises a first, a second, a third, and a fourth total internally reflective surface that each extend from the open end of the cavity to the rim of the base region. The first, second, third, and fourth total internally reflective surfaces receive light that passes through the first, second, third, and fourth sidewalls and reflect that light toward the base region.

In another example embodiment, the optic comprises a base region with a rim and an exit surface. The optic further comprises a projection that projects from the base region, the projection comprising a cavity that extends into the projection towards the base region. The cavity comprises an open end, a concave cavity bottom surface, and a first, a second, a third, and a fourth sidewall that each extends from the open end to the concave cavity bottom surface. The concave cavity bottom surface receives light from a light emitting diode and causes the light to diverge as it passes through the optic. Optionally, the exit surface of the optic can also be concave to achieve further divergence of the light passing through the optic. The optic further comprises a first, a second, a third, and a fourth total internally reflective surface that each extend from the open end of the cavity to the rim of the base region. The first, second, third, and fourth total internally reflective surfaces receive light that passes through the first, second, third, and fourth sidewalls and reflect that light toward the base region where the light exits through the exit surface.

These and other aspects, objects, features, and embodiments will be apparent from the following description and the appended claims.

BRIEF DESCRIPTION OF THE FIGURES

Reference will be made below to the accompanying drawings.

FIG. 6 illustrates a bottom perspective view of a second example embodiment of the square optic in accordance with the example embodiments of the disclosure.

FIG. 7 illustrates a top perspective view of a third example embodiment of the square optic in accordance with the example embodiments of the disclosure.

FIG. 8 illustrates a simulated ray trace showing light rays passing through a cross-sectional view of the square optic of FIGS. 3-5 in accordance with the example embodiments of the disclosure.

FIG. 9 illustrates a simulated ray trace showing light rays passing through a cross-sectional view of the square optic of FIG. 7 in accordance with the example embodiments of the disclosure.

Figure 2:
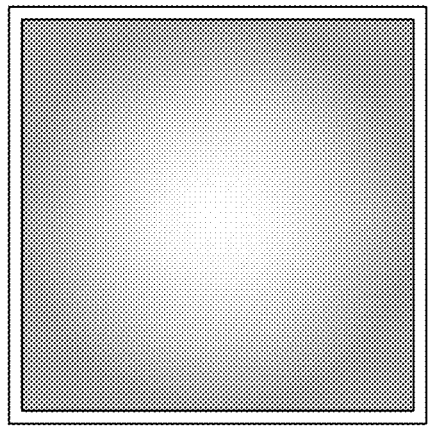
FIG. 2 illustrates a simulation of a luminaire with a square optic and a square aperture in accordance with the example embodiments of the disclosure.

The drawings illustrate only example embodiments and are therefore not to be considered limiting of the embodiments described, as other equally effective embodiments are within the scope of this disclosure. The elements and features shown in the drawings are not necessarily drawn to scale, emphasis instead being placed upon clearly illustrating principles of the embodiments. Additionally, certain dimensions or positions may be exaggerated to help visually convey certain principles. In the drawings, similar reference numerals among different figures designate like or corresponding, but not necessarily identical, elements.

DETAILED DESCRIPTION OF EXAMPLE EMBODIMENTS

Figure 1:
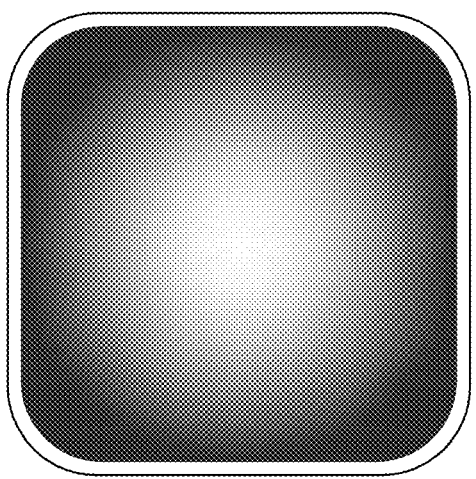
FIG. 1 illustrates a simulation of a luminaire with a circular optic and a substantially square aperture.

A non-circular optic, such as a square optic, used in a luminaire with a square aperture can address one or more of the foregoing deficiencies and provide a more uniformly lit appearance. For example, as shown in the simulated rendering in FIG. 2, a luminaire with a square aperture and that includes a square optic produces a more uniform light distribution and reduces the dark regions in the corners of the square aperture that are visible in FIG. 1. When such a luminaire is recess mounted into a ceiling in a flush configuration, the resulting pattern of illumination can present a desirably uniform illumination pattern.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 3:
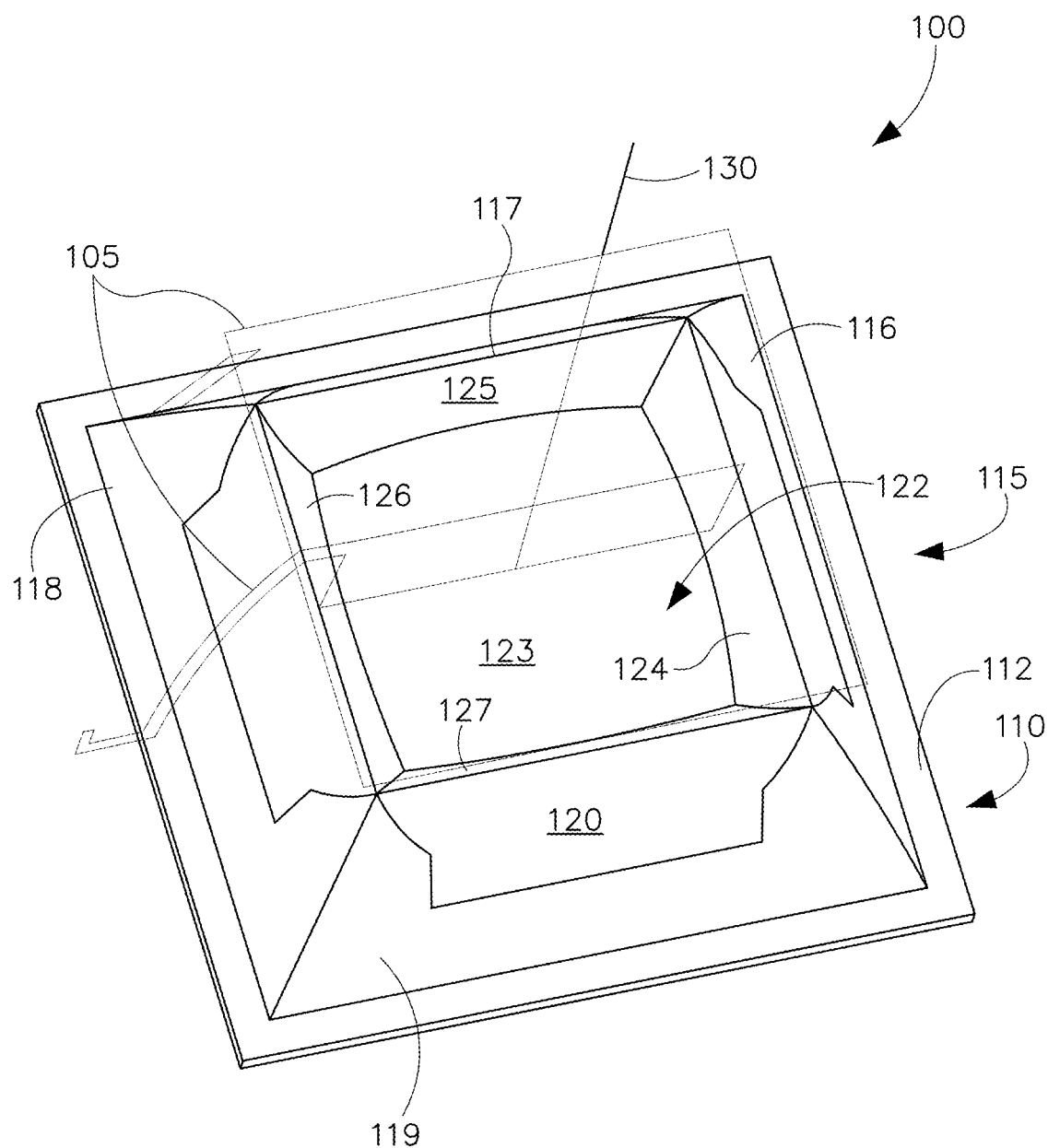
FIG. 3 illustrates a top perspective view of a square optic in accordance with a first example embodiment of the disclosure.
Figure 4:
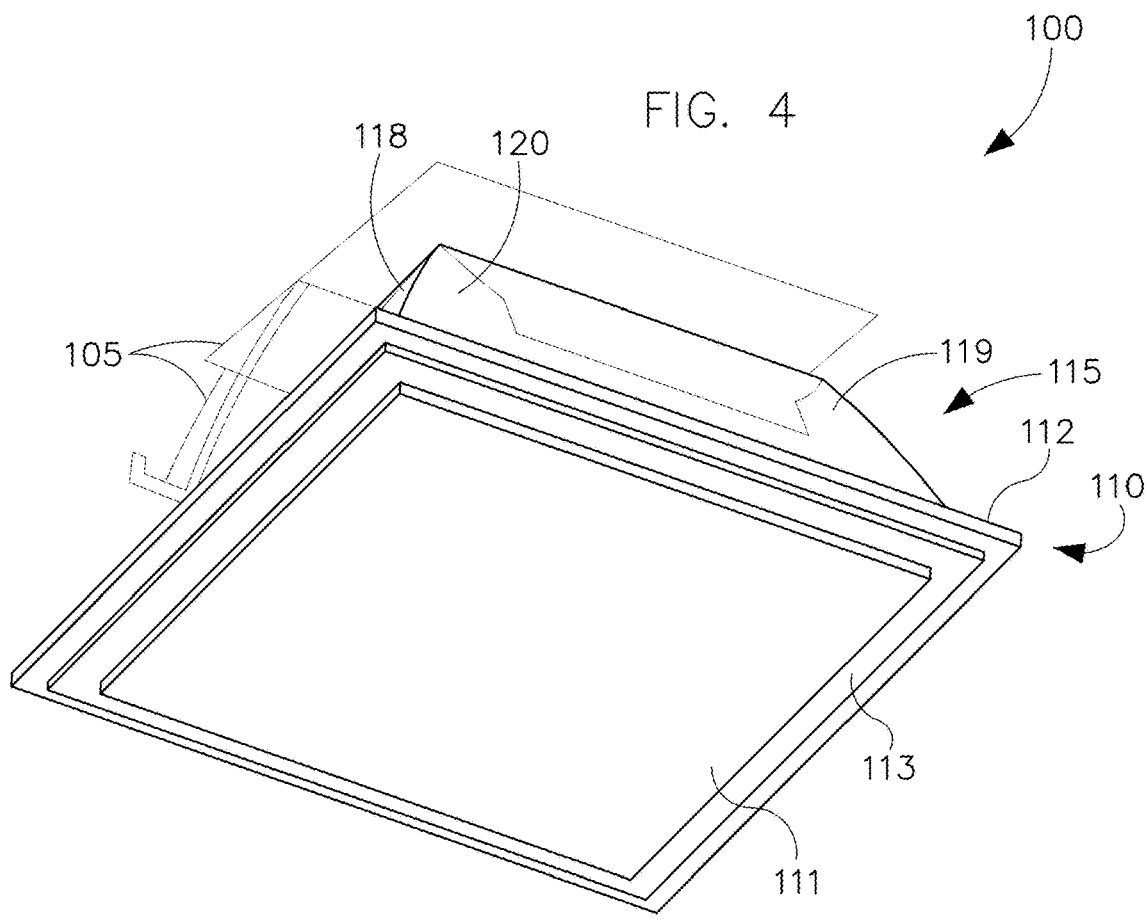
FIG. 4 illustrates a bottom perspective view of the square optic in accordance with the first example embodiment of the disclosure.
Figure 5:
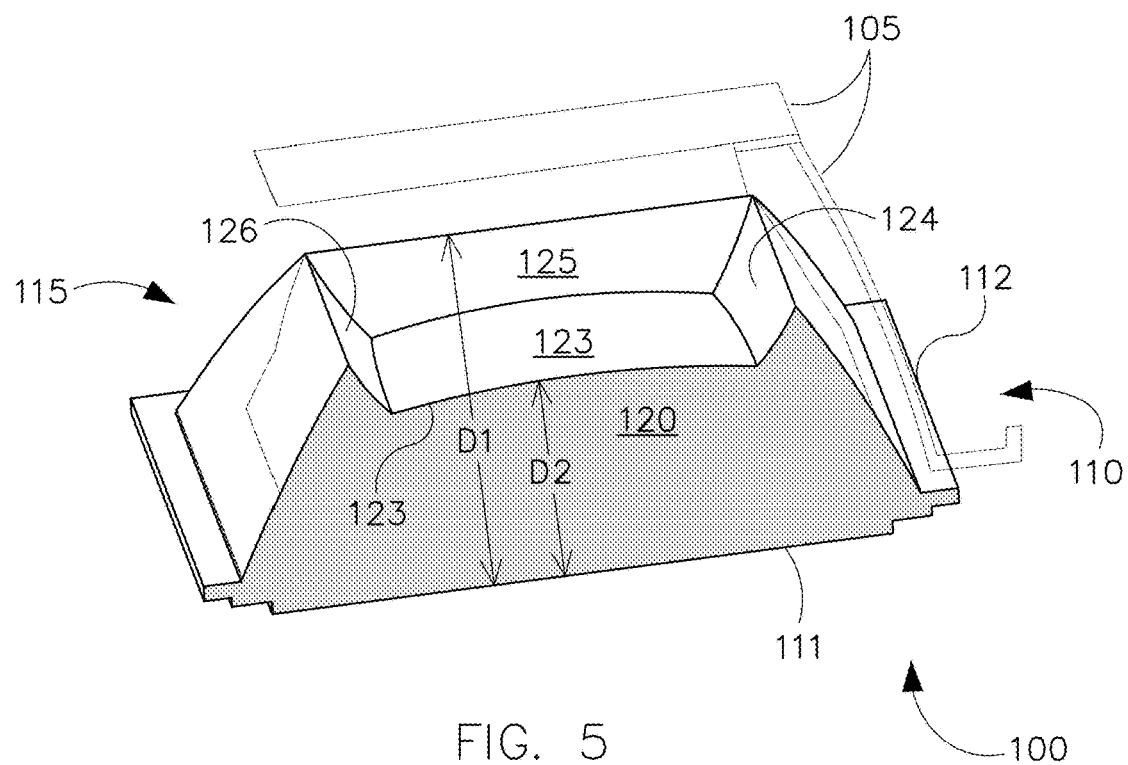
FIG. 5 illustrates a cross-sectional view of the square optic in accordance with the first example embodiment of the disclosure.

FIGS. 3, 4 and 5 illustrate a square optic 100 in accordance with example embodiments of this disclosure. Partial outlines of a luminaire in which the optic 100 can be positioned are also shown in FIGS. 3-5. For example, partial outlines of an example housing 105 of the luminaire are shown in FIGS. 3-5. The optic 100 comprises a base region 110 with a rim 112 that is used to position the optic within the luminaire housing 105. For example, the rim 112 can rest inside a portion of the luminaire housing 105 or be clamped between the luminaire housing 105 and a trim. The rim 112 can surround the entire perimeter of the base region 110 as shown in FIGS. 3-5. Alternatively, in other embodiments, the rim may only surround portions of the perimeter of the base region.

The base region 110 also comprises an exit surface 111 that is square and from which light exits the optic 100 and then passes through an aperture of the luminaire to illuminate an area such as a room or a hallway. The exit surface 111 is flat and defines an exit plane in the embodiment illustrated in FIGS. 3-5, however, in alternate embodiments, the exit surface 111 can be curved or comprise other features. In one embodiment, the exit surface 111 comprises textures or other features that diffuse the light exiting the optic through the exit surface 111 and assist in inhibiting the visibility of LEDs within the luminaire when a person looks up into the aperture of the luminaire. Although the exit surface 111 is square in the embodiment illustrated in FIGS. 3-5, in alternate embodiments the exit surface can have a rectangular or other non-circular shape. The perimeter of the exit surface 111 includes a step feature in the embodiment illustrated in FIGS. 3-5, however, in alternate embodiments the step feature 113 may be absent or may include additional steps.

Projecting from the base region 110 is a projection 115 of the optic 100. The projection 115 and the base region 110 are typically one continuous piece of optical material that can be made from materials suitable for an optic, such as clear acrylic, clear silicone, or another appropriate polymer. The projection 115 comprises four outer walls that form a bottom square shape at the bottom and a top square opening at the top of the volume 120 defined by the walls. In the example embodiment illustrated in FIGS. 3-5, the four outer walls are angled inward toward the top of the optic 100 such that the square shape formed at the top of the four outer walls is smaller than the square shape formed at the bottom where the four outer walls meet the base region 110. Additionally, in the example embodiment illustrated in FIGS. 3-5, the four outer walls have a curvature that curves inward as one moves from the base region 110 to the top square opening. The four outer walls are also referred to herein as a first total internally reflective surface 116, a second total internally reflective surface 117, a third total internally reflective surface 118, and a fourth total internally reflective surface 119. As described further below in connection with FIGS. 8 and 9, the four outer walls or total internally reflective surfaces reflect incident light back into the optic 100 and downward toward the exit surface 111.

At the top of the projection 115 is a cavity 122 defined by a convex cavity bottom surface 123, a square open end at the top of the cavity, a first side wall 124, a second side wall 125, a third side wall 126, and a fourth side wall 127. An axis 130 passes through the center of the convex cavity bottom surface 123 and the center of the exit surface 111. In the embodiment illustrated in FIGS. 3-5, the first, second, third, and fourth side walls 124-127 are slightly concave to minimize refraction of light entering the side walls, however, in alternate embodiments the side walls can be flat or have other shapes. Likewise, the convex cavity bottom surface 123 is shaped to condense light entering the convex cavity bottom surface 123 from one or more light sources above. However, in alternate embodiments the convex cavity bottom surface 123 can have a flat shape or another shape. As further illustrated in the example embodiment in FIG. 5, the shortest distance between the center of the convex cavity bottom surface 123 and the exit surface 111 is identified as D2. The shortest distance between the open end at the top of the cavity and the exit surface 111 is identified as D1. As illustrated in FIG. 5, distance D2 is more than half of distance D1.

Referring now to FIG. 8, a simulated ray trace illustration is provided that shows the path of light beams originating at a light source 806 and passing through optic 100 which has the features described previously in connection with FIGS. 3-5. The light source 806 is shown as a point source for simplicity in FIG. 8, however, one of skill in the field should understand that the light source 806 can also have width and depth or consist of an array of light sources. The light source 806 can be a single light emitting diode, such as a chip-on-board light emitting diode, or a cluster or array of light emitting diodes. An array of light sources can be mounted in a variety of shapes including square and other configurations. In other alternatives, the light source 806 can be an organic light emitting diode or another type of light source. The light source 806 is mounted on an inner surface of the luminaire housing 105 so that it directs light downward through optic 100 and through exit surface 111 so that it will exit an aperture of the luminaire to illuminate a room or hallway, for example. In FIG. 8, only a portion of the luminaire housing 105 is shown so as not to obscure the optic.

As shown in the ray trace illustration of FIG. 8, a first portion of the light emitted from the light source 806 passes through the cavity 122 and the convex cavity bottom surface 123. The first portion of the light that passes through the convex cavity bottom surface 123 is refracted and may be focused, condensed, or collimated before the light exits through the exit surface 111. A second portion of the light from the light source 806 passes through the first, second, third, and fourth sidewalls 124, 125, 126, and 127 and then reflects off the respective first, second, third, and fourth total internally reflective surfaces 116, 117, 118, and 119 so that the light is directed downward and out the exit surface 111. The second portion of the light exits the exit surface 111 along the periphery of the exit surface 111 thereby eliminating the dark regions visible in the prior art luminaire shown in FIG. 1.

Referring now to FIGS. 6 and 7, alternate embodiments of the optic 100 are shown as optics 600 and 700. Those features of the optics 600 and 700 that are the same or analogous to the features of optic 100 have reference numbers with the same last two digits as the reference numbers of the features of optic 100 and will not be described again in detail for the sake of brevity.

Referring now to FIG. 6, example optic 600 is similar to optic 100, except that the exit surface 611 comprises a cavity 622. The cavity 622 is defined by an exit cavity convex surface 632 and four exit cavity side walls with two of such exit cavity sidewalls 624 and 625 visible in FIG. 6. Optic 600 processes light in a similar manner as optic 100. Optic 600 comprises a cavity at the top portion of the optic that is similar to cavity 122 and that comprises a convex bottom surface that directs a portion of the light from a light source through the exit surface 611 and the exit cavity convex surface 632. Likewise, optic 600 comprises four outer walls, two of which 618 and 619 are visible in FIG. 6. The four outer walls of optic 600 are similar to first, second, third, and fourth total internally reflective surfaces 116, 117, 118, and 119 and direct a portion of the light from a light source downward toward exit surface 611 and the exit cavity convex surface 632. The additional cavity 622 and exit cavity convex surface 632 further refract and condense a portion of the light exiting the exit surface 611 and the exit cavity convex surface 632. In other alternate embodiments, the cavity 622 and exit cavity convex surface 632 can be further modified to adjust the light output from the optic.

Referring now to FIG. 7, example optic 700 is similar to optic 100 except that optic 700 comprises four chamfered total internally reflective surfaces, each located at a corner of the protrusion 715 of optic 700. Two of the chamfered total internally reflective surfaces 741 and 744 are visible in FIG. 7. FIG. 9 provides an illustration of a simulated ray trace of light passing through optic 700. As illustrated in FIG. 9, optic 700 processes light in a similar manner as optic 100. Optic 700 comprises a cavity 722 at the top portion of the optic that is similar to cavity 122 and that comprises a convex bottom surface 723 that directs a portion of the light from a light source 906 through the exit surface 711. Likewise, optic 700 comprises four outer walls, three of which 716, 718, and 719 are visible in FIG. 7. The four outer walls of optic 700 are similar to first, second, third, and fourth total internally reflective surfaces 116, 117, 118, and 119 and direct a portion of the light from the light source 906 downward toward exit surface 711. As illustrated in FIG. 9, the additional chamfered total internally reflective surfaces, such as surface 744 shown in FIG. 9, further enhance and increase the distribution of light in the corners of the exit surface 711 to further reduce the appearance of dark regions in the corners of the optic 700. That is, the chamfered surfaces direct more light in a straight downward path towards the exit surface 711 and reduce the amount of light directed at an angle (into or out of the page in FIG. 9) as it travels toward the exit surface 711.

Figure 10:
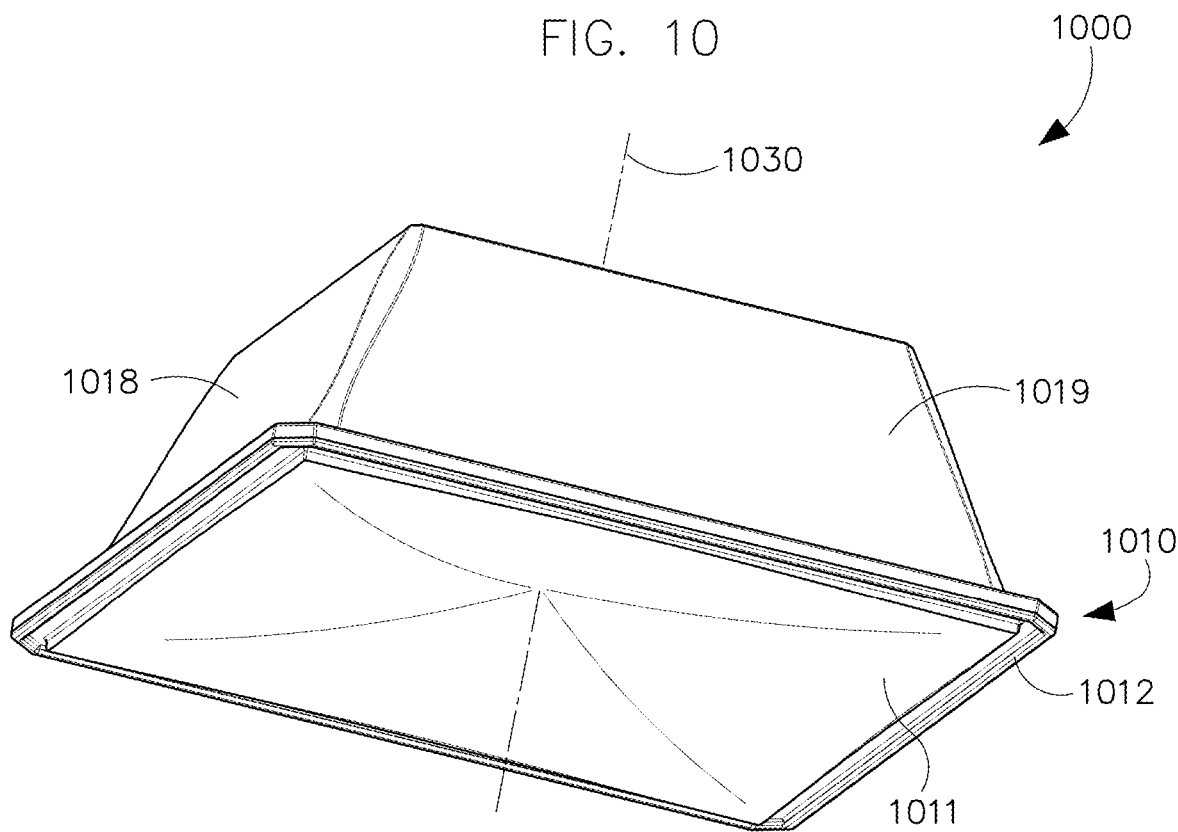
FIG. 10 illustrates a bottom perspective view of a fourth example embodiment of the square optic in accordance with example embodiments of the disclosure.
Figure 11:
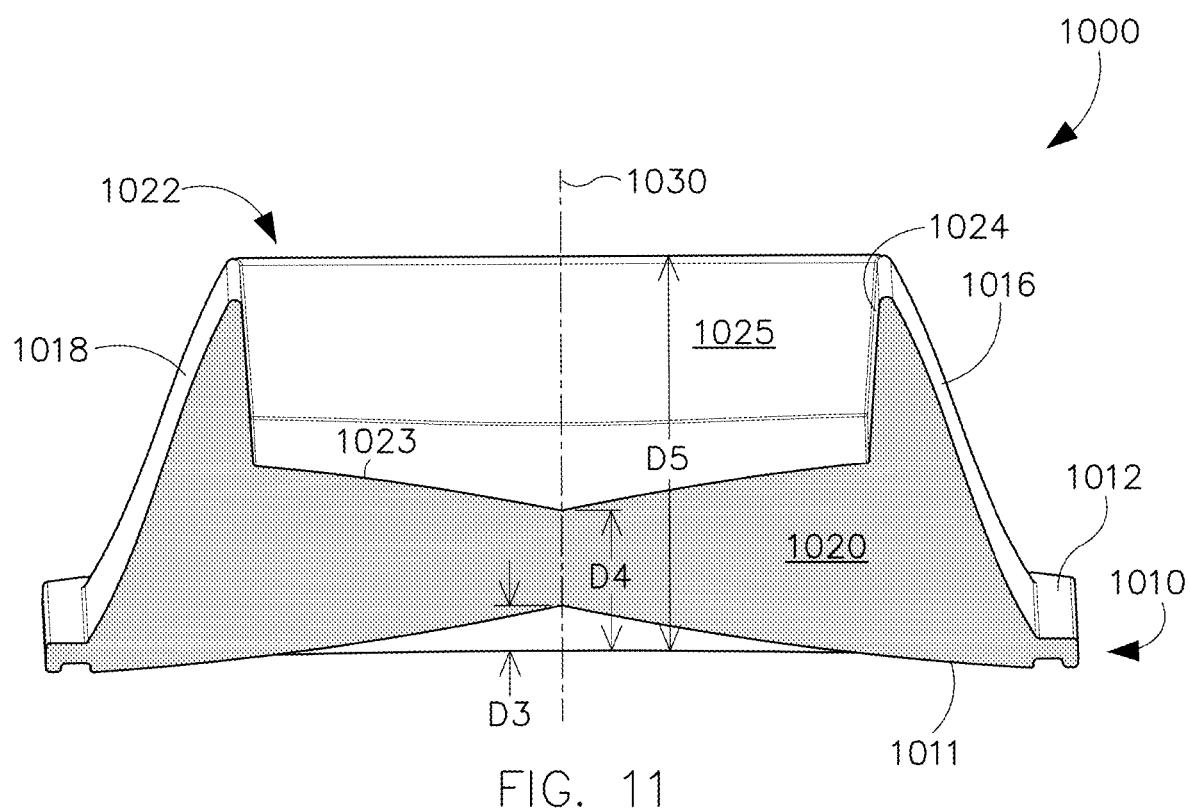
FIG. 11 illustrates a cross-sectional view of the fourth example embodiment of the square optic in accordance with example embodiments of the disclosure.

Referring now to FIGS. 10 and 11, an alternate embodiment of the optic 100 is shown as optic 1000. Unless otherwise described below, those features of the optic 1000 that are the same or analogous to the features of optic 100 have reference numbers with the same last two digits as the reference numbers of the features of optic 100 and will not be described again in detail for the sake of brevity.

Referring now to FIGS. 10 and 11, example optic 1000 is similar to optic 100 in that it comprises an exit surface 1011, a base region 1010, a rim 1012, and a projection that comprises a first total internally reflective surface 1016, a second total internally reflective surface (not visible in FIGS. 10 and 11), a third total internally reflective surface 1018, and a fourth total internally reflective surface 1019. The projection of optic 1000 also comprises a cavity 1022 defined by a cavity bottom surface 1023, an open end at the top of the cavity 1022, a first side wall 1024, a second side wall 1025, a third side wall 1026, and a fourth side wall (not visible in FIGS. 10 and 11).

Optic 1000 differs from optic 100 in that the exit surface 1011 and the cavity bottom surface 1023 are both concave. The concave shape of both the exit surface 1011 and the cavity bottom surface 1023 causes the light passing through the optic to diverge. In alternate embodiments of the optic 1000, one of the exit surface 1011 or the cavity bottom surface 1023 can be altered so that it is planar thereby causing less divergence of the light than that achieved with optic 1000. An axis 1030 passes through the center of the cavity bottom surface 1023 and the center of the exit surface 1011. As further illustrated in FIG. 11, the shortest distance along the axis 1030 from the exit surface 1011 to a plane defined by the outer edge of the exit surface 1011 is identified as D3. The shortest distance along the axis 1030 from the cavity bottom surface 1023 to the plane defined by the outer edge of the exit surface 1011 is identified as D4. Lastly, the shortest distance between the open end at the top of the cavity 1022 and the plane defined by the outer edge of the exit surface 1011 is identified as D5. In the example of optic 1000, distance D4 is less than half the distance D5.

Figure 12:
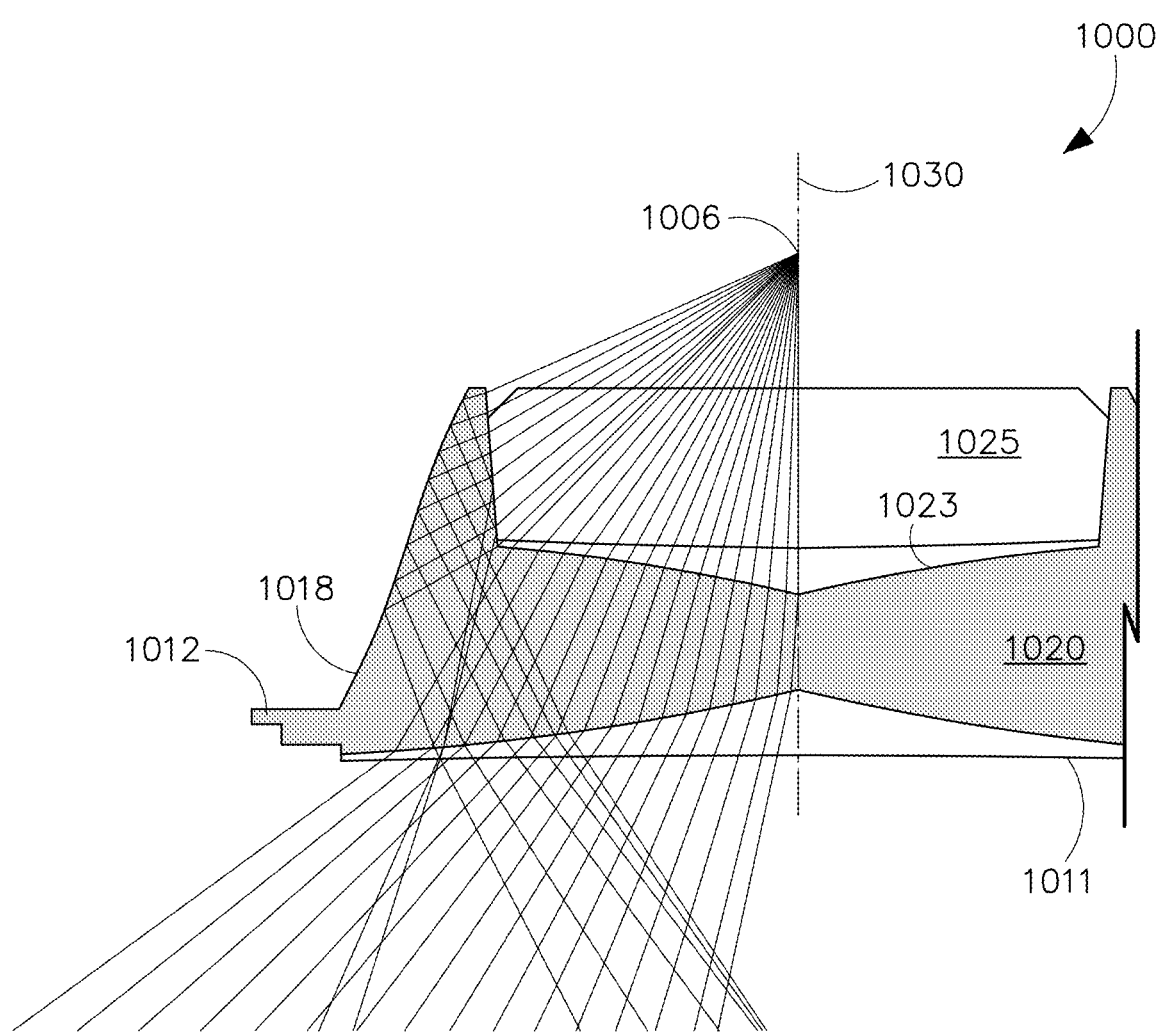
FIG. 12 is a simulated ray trace showing light rays passing through a cross-sectional view of the fourth example square optic of FIGS. 10 and 11 in accordance with example embodiments of the disclosure.

FIG. 12 provides a simulated ray trace illustration that shows the path of light beams originating at a light source 1006 and passing through optic 1000 having the features described in connection with FIGS. 10 and 11. The light source 1006 is shown as a point source for the sake of simplicity in FIG. 12, however, it should be understood that the light source can be any of the types of light sources described above in connection with FIG. 8. As shown in the ray trace illustration, a first portion of the light emitted from light source 1006 passes through the cavity 1022, the concave cavity bottom surface 1023, and the concave exit surface 1011. The two concave surfaces cause this first portion of the light to exit optic 1000 in a diverging pattern as illustrated by the ray trace lines thereby reducing the dark regions shown in the corners of the prior art luminaire illustrated in FIG. 1. A second portion of the light from the light source 1006 passes through the first, second, third, and fourth sidewalls and then reflects off the respective first, second, third, and fourth total internally reflective surfaces so that the light is directed downward and through the concave exit surface 1011. This second portion of light can also be reflected off the chamfered corners between the total internally reflective surfaces that are shown in FIG. 10. The second portion of the light also diverges as it exits the exit surface 1011 assisting in an even distribution of the light exiting the optic 1000.

While the foregoing embodiments illustrate varying light distribution patterns that can be achieved, including condensed and diverging, in other embodiments other variations of light output can be achieved including off axis, biased laterally, and asymmetrical according to application parameters. In various embodiments, elements, features, and contours of the example optics may be continuous, discontinuous, smoothly joined, or abruptly separated. In some embodiments, texturing or micro-features can be added to optical surfaces to promote diffusion or spread of the light distribution pattern.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. An optic comprising:
    a base region that comprises a rim and an exit surface, the exit surface defining an exit plane, wherein the rim is configured to be clamped between a trim engaging the exit surface and a housing of a recessed luminaire on a side of the rim opposing the exit surface;
    a projection that projects from the base region and away from the exit plane and that comprises:
        a cavity that extends into the projection, along an axis, and towards the base region, the cavity comprising:
            an open end that receives light from one or more light emitting diodes;
            a convex cavity bottom surface disposed at the bottom of the cavity and that is oriented to condense a portion of the light that is received at the open end; and
            a first, a second, a third, and a fourth sidewall that each extend from the open end to the convex cavity bottom surface;
        a first, a second, a third, and a fourth total internally reflective surface that each extend from the open end to the rim of the base region, that are each tapered, and that are each oriented to totally internally reflect another portion of the light that passes through one of the first, the second, the third, and the fourth sidewalls, so that the another portion of the received light is reflected towards the base region; and
        four chamfered corners, wherein the four chamfered corners are disposed where each of the first, the second, the third, and the fourth total internally reflective surfaces meet, wherein each of the four chamfered corners extend from the open end to the rim of the base region, and wherein each of the four chamfered corners is more narrow at the open end and wider at the rim of the base region.

2. The optic of claim 1, wherein the base region comprises a step feature along the rim.

3. The recessed luminaire comprising the optic of claim 1, wherein the optic is disposed within the housing of the recessed luminaire and the rim is clamped between the trim engaging the exit surface and the housing of the recessed luminaire.

4. The optic of claim 1, wherein the base region comprises an exit cavity recessed into the exit surface, wherein the exit surface immediately surrounding the exit cavity is flat.

5. The optic of claim 4, wherein the exit cavity comprises a convex exit surface and four exit side walls.

6. The optic of claim 1, wherein the exit surface is flat.

7. The optic of claim 1, wherein the exit surface is square.

8. The optic of claim 1, wherein the first, the second, the third, and the fourth sidewalls of the cavity are concave.

9. The optic of claim 1, wherein the axis is substantially perpendicular to a tangent of the convex cavity bottom surface taken where the axis intersects the convex cavity bottom surface.

10. The optic of claim 1, wherein the optic consists of a unitary piece of optical material.

11. The optic of claim 1, wherein each of the four chamfered corners is oriented to reflect the another portion of the light towards the base region.

12. The recessed luminaire comprising the optic of claim 1, wherein the recessed luminaire has a square aperture through which light passes from the exit surface.

13. The recessed luminaire comprising the optic of claim 12, wherein the one or more LEDs are mounted on an inside surface of the housing of the recessed luminaire.

14. An optic comprising:
    a base region that comprises a rim and a concave exit surface, the rim defining an exit plane;
    a projection that projects from the base region and away from the exit plane and that comprises:
        a cavity that extends into the projection, along an axis, and towards the base region, the cavity comprising:
            an open end that receives light from one or more light emitting diodes;
            a concave cavity bottom surface disposed at the bottom of the cavity and that is oriented to diverge a portion of the light that is received at the open end, the axis passing through a center of the concave cavity bottom surface and a center of the concave exit surface; and
            a first, a second, a third, and a fourth sidewall that each extend from the open end to the concave cavity bottom surface; and
        a first, a second, a third, and a fourth total internally reflective surface that each extend from the open end to the rim of the base region, that are each tapered, and that are each oriented to totally internally reflect another portion of the light that passes through one of the first, the second, the third, and the fourth sidewalls, so that the another portion of the light is reflected towards the base region,
    wherein a first distance along the axis from the center of the concave cavity bottom surface to a center of the exit plane is less than half a second distance from a center of the open end to the center of the exit plane.

15. The optic of claim 14, wherein the base region comprises a step feature along the rim.

16. The optic of claim 14, wherein the first, the second, the third, and the fourth total internally reflective surfaces form four lateral sides of the optic comprising four corners of the optic.

17. The optic of claim 14, further comprising four chamfered corners, wherein the four chamfered corners are disposed where each of the first, the second, the third, and the fourth total internally reflective surfaces each meet.

* * * * *